Nov. 18, 1924.

L. D. LIVINGSTON

RADIUS ROD NUT CLAMP

Filed Feb. 1, 1924

1,515,781

Inventor
Levi D. Livingston
By Richard B. Owen,
Attorney

WITNESSES

Patented Nov. 18, 1924.

1,515,781

UNITED STATES PATENT OFFICE.

LEVI D. LIVINGSTON, OF JOPLIN, MISSOURI.

RADIUS-ROD NUT CLAMP.

Application filed February 1, 1924. Serial No. 690,028.

*To all whom it may concern:*

Be it known that I, LEVI D. LIVINGSTON, a citizen of the United States, residing at Joplin, in the county of Jasper and State of Missouri, have invented certain new and useful Improvements in a Radius-Rod Nut Clamp, of which the following is a specification.

This invention appertains to an attachment for automobiles and the primary object of the invention is to provide an improved appliance for effectively preventing the working loose of the spring perch and radius rod of a front axle of a motor vehicle, thereby eliminating accidents caused from this contingency.

Another object of the invention is the provision of a novel clamp connected with the axle of the vehicle and having means for receiving the nut on the spring perch and supporting the radius rod, the means for receiving the nut being so constructed as to prevent rotation thereof, thereby effectively holding the spring perch and rod in place.

A further object of the invention is the provision of novel means for holding the clamp in place on the axle against accidental movement and displacement.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1:
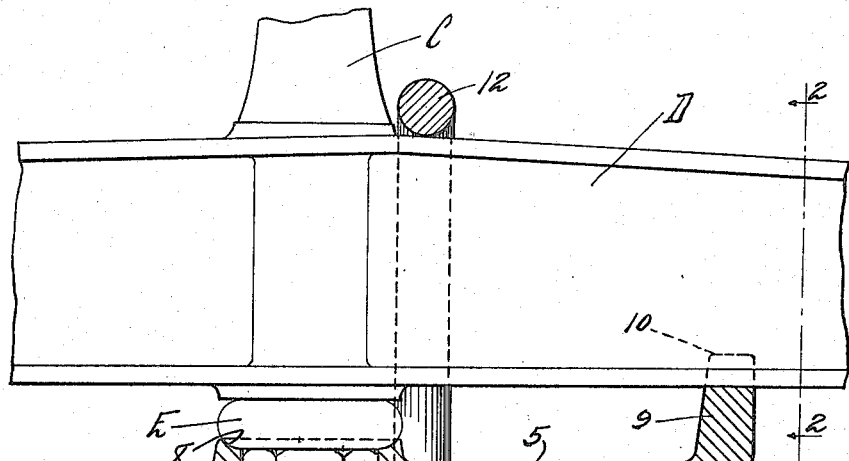
Figure 1 is a longitudinal section taken through the improved attachment on the line 1—1 of Figure 2, the device being shown applied to the axle and spring perch nut.
Figure 2:
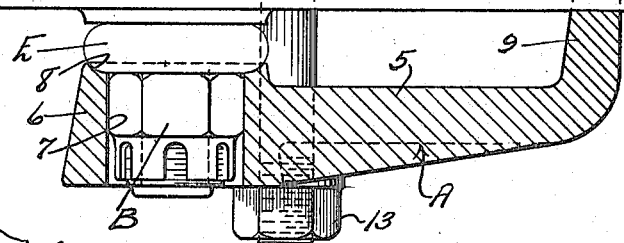
Figure 2 is a section taken on the line 2—2 of Figure 1 showing the appliance in end elevation.
Figure 3:
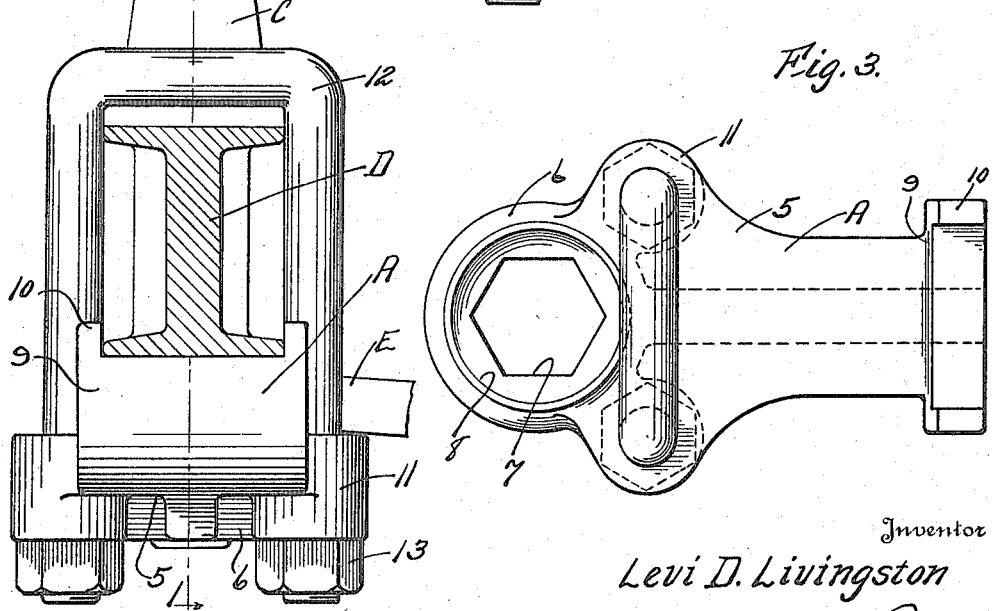
Figure 3 is a top plan view of the improved attachment.

Referring to the drawings in detail, wherein similar reference characters designate corresponding parts throughout the several views, the letter A generally indicates the improved attachment for holding the nut B of a spring perch C in position against accidental displacement. As shown the spring perch C extends through the front axle D of a motor vehicle in the ordinary way and receives the usual front radius rod E, which is normally confined between the axle D and the nut B. As shown the nut B is of a hexagonal type and is threaded on the lower end of the spring perch C in intimate engagement with the radius rod E.

The improved attachment A comprises a body plate 5 having the circular extension 6 formed on the inner end thereof which is provided with an axial hexagonal shaped opening 7 for receiving the nut B. The upper surface of the circular extension 6 is preferably countersunk or shaped as at 8 for receiving the eye end of the radius rod E. The outer end of the body plate 5 is provided with an upwardly extending foot 9 provided with ears 10 which are adapted to engage the axle D on opposite sides thereof, so as to prevent turning movement of the said body plate. Laterally extending apertured ears 11 are formed on the opposite sides of the body plate 5 adjacent to the circular extension 6 for the reception of the legs of the U-shaped clamping bolt 12 which is adapted to extend over the axle D. Suitable nuts 13 are adapted to be threaded on the ends of the arms of the U-shaped bolt 12 in contact with the ears 11 for holding the clamping bolt 12 in place against accidental displacement.

From the foregoing description, it can be seen that the attachment A effectively holds the nut B in position on the spring perch C against accidental displacement and that the attachment forms a support for the radius rod E. By holding the nut G against rotation and by forming a support for the radius rod E, the spring perch C is held firmly in place, thereby preventing loosening of these parts and displacement of the radius rod.

Changes in details may be made without departing from the spirit or the scope of this invention.

What I claim as new is:

1. The combination with a vehicle axle, a spring perch extending through the vehicle axle, a radius rod fitted on the perch in engagement with the axle, and a nut threaded on the perch in engagement with the radius rod, of an attachment for the perch and radius rod including a body plate, a foot formed on one end of the plate, for engaging the axle, means for clamping the plate to the axle, and an extension formed on the plate having an opening of polygonal shape for receiving the nut and for supporting the radius rod.

2. The combination with a vehicle including a front axle, a spring perch extending through the axle, a radius rod fitted on the perch in engagement with the axle and a nut threaded on the lower end of the perch in engagement with the radius rod, of an attachment for the vehicle including a plate disposed below the axle, an upwardly extending foot formed on the outer end of the plate, lugs formed on the foot engaging the opposite sides of the axle, an extension formed on the inner end of the plate having an opening formed therein for snugly receiving the nut and for supporting the radius rod, and a U-shaped bolt receiving the axle and extending through said plate for holding the same in position against accidental displacement.

In testimony whereof I affix my signature in presence of two witnesses.

LEVI D. LIVINGSTON.

Witnesses:
C. F. CALVIN,
M. H. DUNAWAY.